United States Patent [19]

Abhat et al.

[11] 4,131,158

[45] Dec. 26, 1978

[54] STORAGE ARRANGEMENT FOR THERMAL ENERGY

[75] Inventors: Ashok Abhat, Bombay, India; Günther Neuer, Leinfelden-Echterdingen, Germany

[73] Assignee: Institut für Kerntechnik und Energiewandlung e.V., Stuttgart, Germany

[21] Appl. No.: 760,286

[22] Filed: Jan. 19, 1977

[30] Foreign Application Priority Data

Jan. 23, 1976 [DE] Fed. Rep. of Germany ....... 2602530

[51] Int. Cl.² ............................................. F23D 21/00
[52] U.S. Cl. ................................ 165/104 S; 126/400; 165/105; 237/1 A
[58] Field of Search ............................ 165/104 S, 105; 126/400, 271

[56] References Cited

U.S. PATENT DOCUMENTS

| 2,911,513 | 11/1959 | MacCracken | 165/104 S X |
| 3,688,838 | 9/1972 | Sturm et al. | 165/104 S X |
| 3,996,919 | 12/1976 | Hepp | 165/104 S X |

Primary Examiner—Albert W. Davis, Jr.
Attorney, Agent, or Firm—Hans Berman

[57] ABSTRACT

Heat of liquefaction and solidification is transmitted between a heat storing material undergoing the phase transition and a heating medium in a heat exchanger by means of a partly gaseous, partly liquid fluid sealed in a heat pipe a portion of which is received in the container for the aforementioned material, and which is equipped with fins in direct contact with the heat storing material while a second portion of the heat pipe is in thermal contact with the heating medium in the heat exchanger.

7 Claims, 9 Drawing Figures

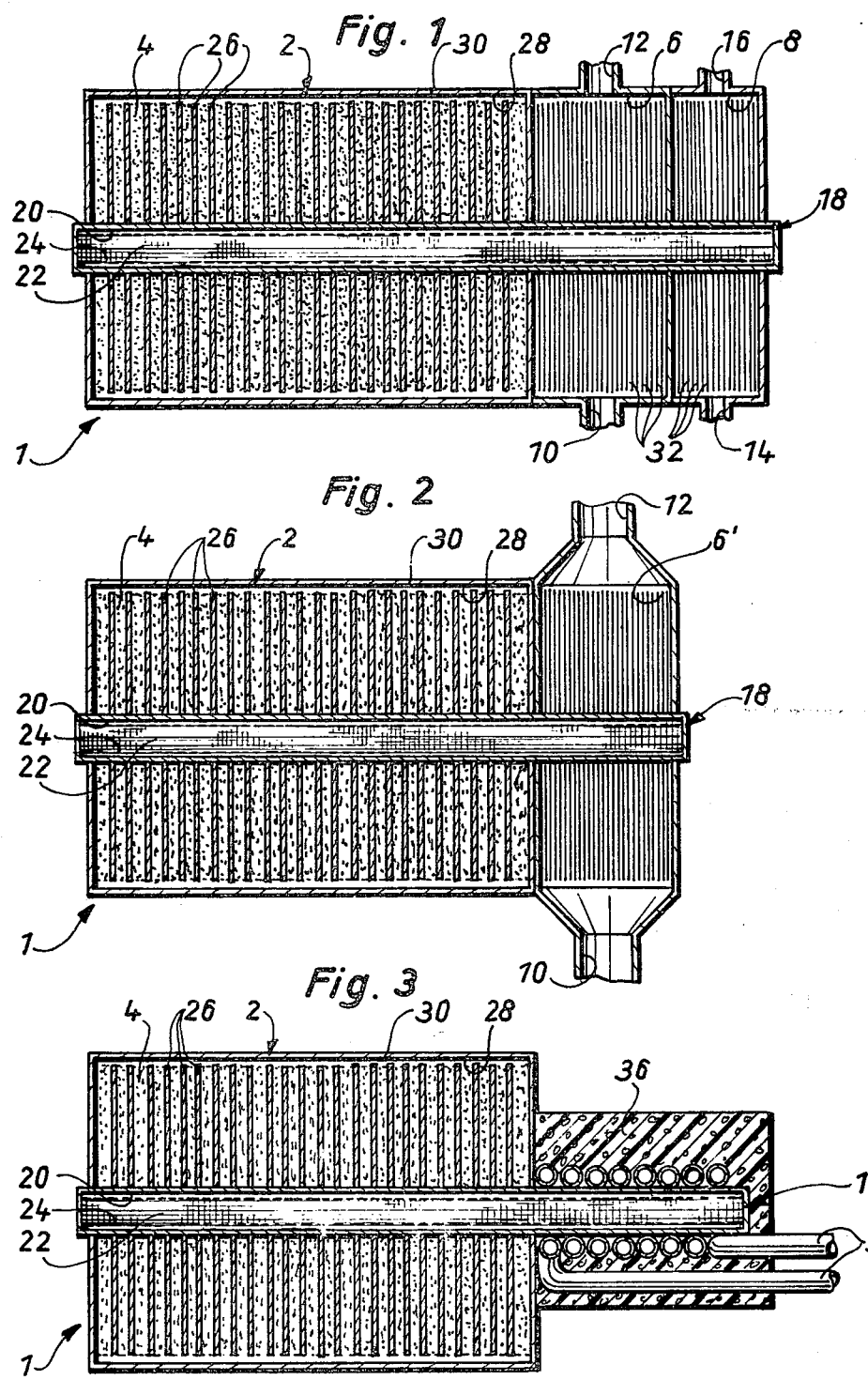

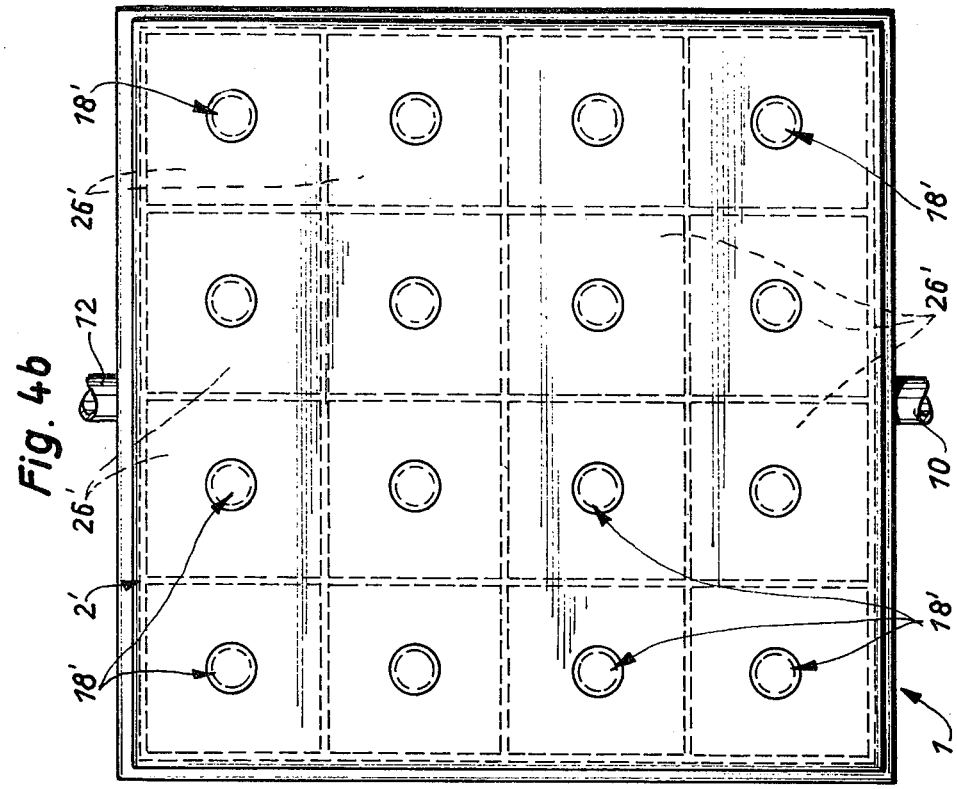
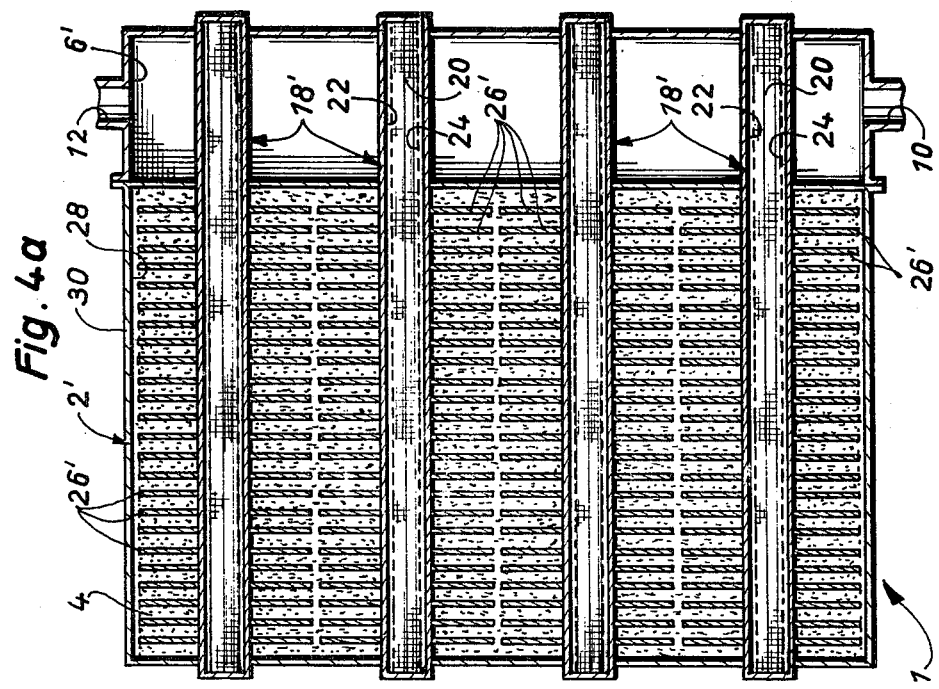

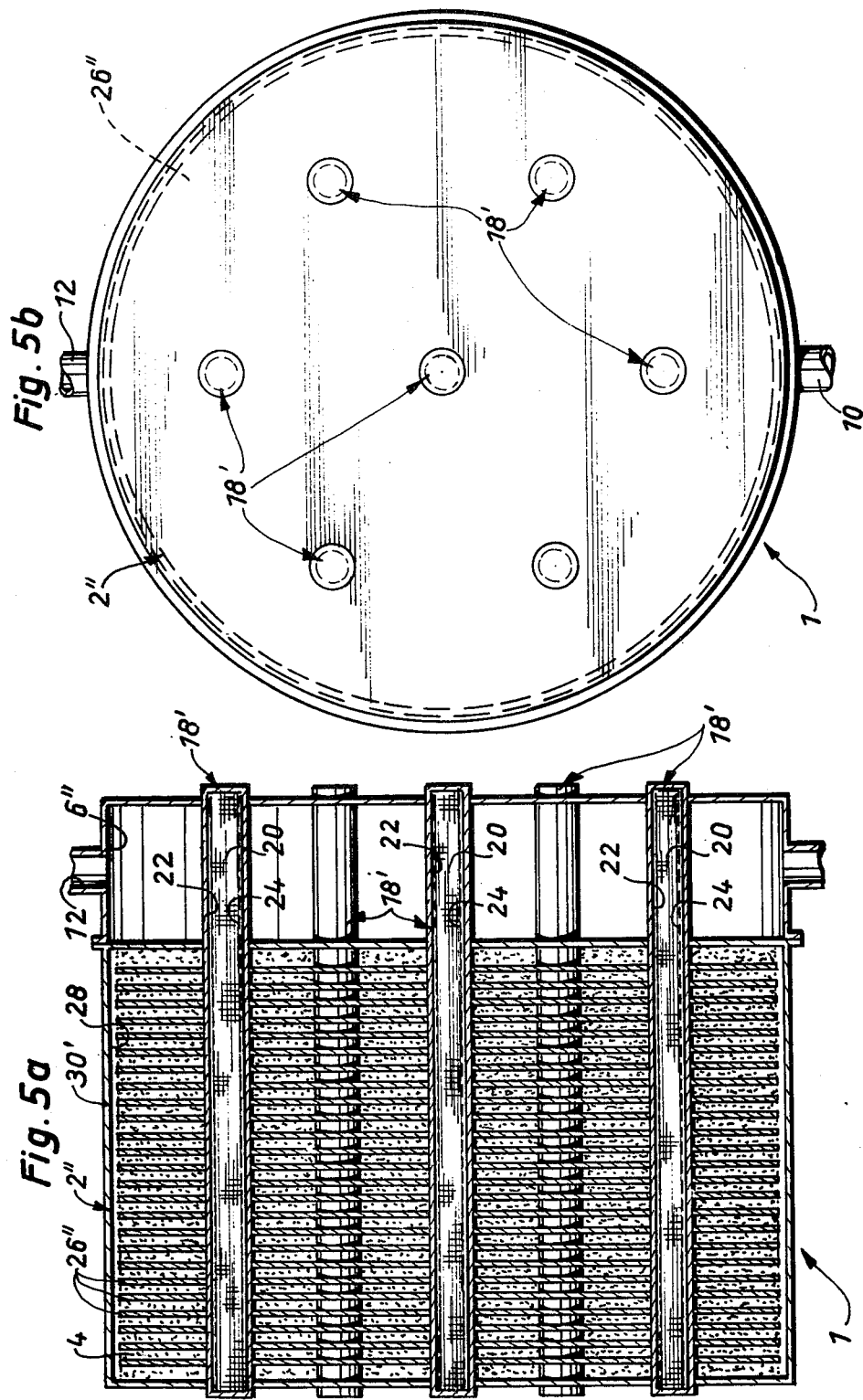

STORAGE ARRANGEMENT FOR THERMAL ENERGY

This invention relates to thermal storage arrangements, and particularly to an arrangement in which thermal energy is stored as heat of liquefaction or heat of solidification in a material undergoing a phase transition between the liquid and solid states when at a certain temperature.

It is known to store thermal energy in the form of sensible heat or of latent heat. Storage arrangements relying on sensible heat may provide direct contact between a heating and cooling fluid and a solid in which thermal energy is to be stored and thus require relatively simple apparatus. It is usually necessary to separate the energy storing material and the heating and cooling fluid by a thermally conductive wall if the energy storing material undergoes a substantially isothermal phase transition when receiving or releasing thermal energy. The resulting more complex structure is acceptable where the advantages of approximately isothermal operation and smaller space requirements are important. Heat storage arrangements relying on storage of latent heat have normally been preferred where low bulk of the arrangement is important, as in space vehicles, but also in many terrestrial applications.

The benefits derived from storing latent heat are commensurate to a large extent with the efficiency of the indirect heat transfer between the heat storing material and the heating and cooling fluid which supplies the heat to be stored and removes the stored heat in a heating and/or refrigerating system. It has now been found that a sealed tube enclosing a fluid which is partly liquid and partly gaseous at the transition temperature of the heat storing material most efficiently transfers thermal energy from and to the heating and cooling fluid.

In its more specific aspects, this invention thus provides a thermal energy storage arrangement in which a container bounds a chamber. A heat storing material in the chamber undergoes a phase transition between the liquid and solid states at a predetermined temperature uniquely defined by the nature of the material. The arrangement further includes a heat exchanger having an intake port and a discharge port and defining a through passage which connects the ports for flow of a heating and cooling medium between the ports, the medium being a gas or a liquid. An elongated sealed tube has a first longitudinal portion in the chamber and a second longitudinal portion outside the chamber in thermal contact with the medium flowing through the passage of the heat exchanger. Fins of thermally conductive material transversely project from the first tube portion into direct contact with the heat storing material. The tube encloses a fluid which is partly liquid and partly gaseous at the phase transition temperature of the heat storing material.

Other features, additional objects, and many of the attendant advantages of this invention will readily be appreciated as the same becomes better understood from the following detailed description of preferred embodiments when considered in connection with the appended drawing in which:

FIG. 1 shows a thermal storage arrangement of the invention in side-elevational section;

FIGS. 2 and 3 illustrate modified arrangements in views corresponding to that of FIG. 1;

FIG. 4a is a side-elevational, sectional view of another thermal storage arrangement of the invention;

FIG. 4b shows the apparatus of FIG. 4a in front elevation;

FIGS. 5a and 5b illustrate a modification of the apparatus of FIGS. 4a, 4b in respective corresponding views.

Figure 6:
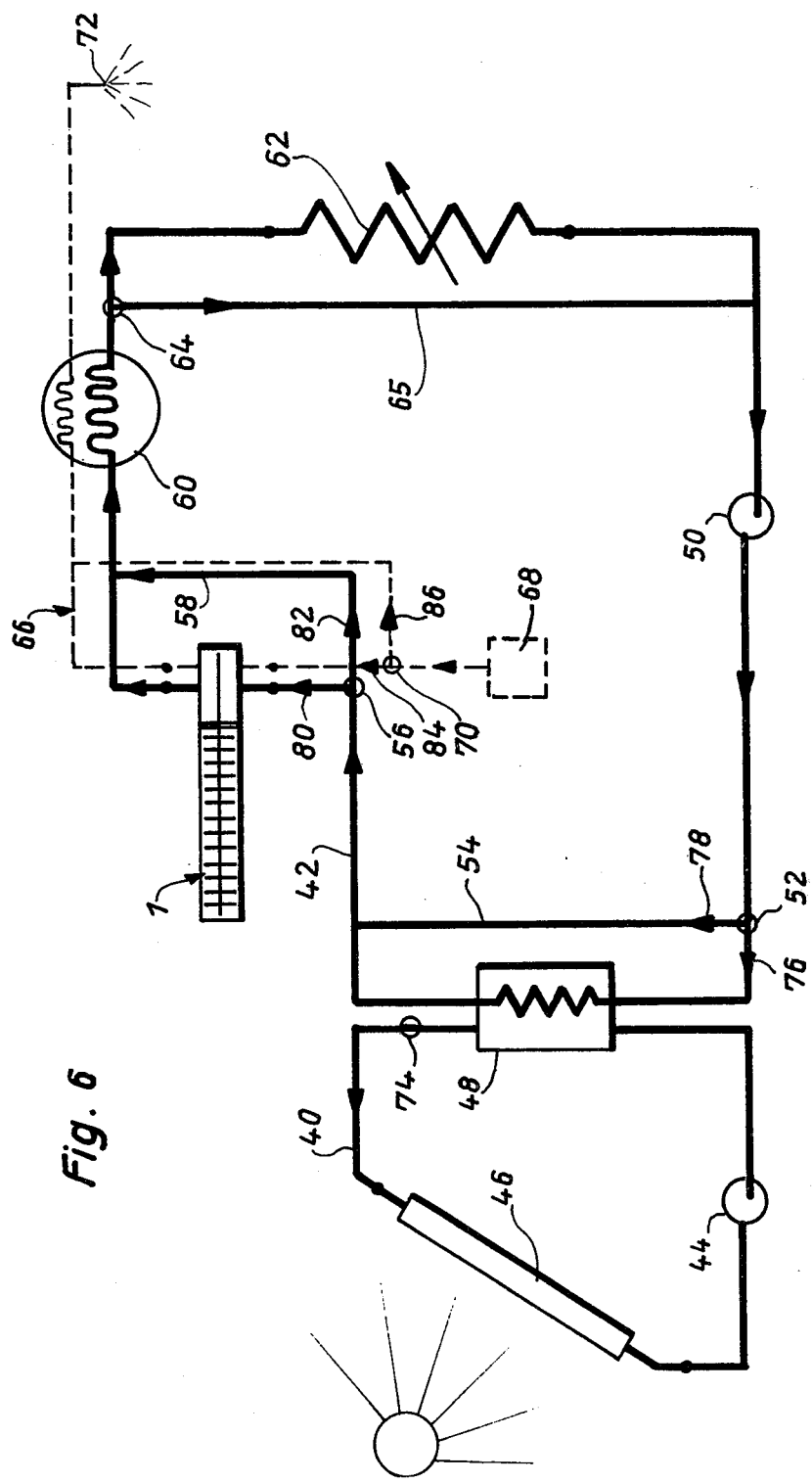
FIGS. 6 and 7 are flow sheets of domestic, solar heating systems employing the thermal storage arrangement of FIG. 1.

Referring now to the drawing in detail, and initially to FIG. 1, there is seen a thermal storage device 1 including a prismatic casing 2. The chamber in the casing is almost completely filled with a heat storing material 4, typically a paraffin wax mixture melting at about 50° C. A heat exchanger 6 has an upright wall in common with the casing 2 and another, parallel, upright wall in common with an additional heat exchanger 8. An intake port 10 and a discharge port 12 are connected by the hollow interior of the heat exchanger 6 for flow of a heating and/or cooling medium, and the interior of the heat exchanger 8 provides an analogous passage between intake and discharge ports 14,16.

A sealed, cylindrical heat pipe 18 extends horizontally through the chamber in the casing 2 and the passages of the heat exchangers 6,8. The interior of the pipe 18 is divided into a circumferential zone 22 and a central zone 20 by a tube 24 of porous synthetic fabric having capillary pores, and is filled with one of the chlorofluoro-alkanes, particularly halogenated methanes and ethanes, which are conventionally employed as heat transfer fluids in refrigeration systems. The pressure of the refrigerant in the heat pipe 18 is selected to keep the fluid partly liquid and partly gaseous at the transition temperature of the paraffin wax 4. The several longitudinal portions of the pipe 18 are supported in the outer walls and partitions of the apparatus.

The pipe 18 consists of corrosion resistant stainless steel. Aluminum fins 26 are closely and uniformly spaced along the portion of the pipe 18 in the chamber of the casing 1. They are rectangular and project at right angles from the pipe 18 to which they are welded for good thermal contact. Their circumferential edges bound gaps 28 with the four inner wall faces 30 of the casing 1 so as to facilitate charging of the casing chamber with the molten heat storing material. The width of each gap 28 is but a small fraction of the distance between the gap and the pipe 18 which passes approximately centrally through the chamber in the casing and the similarly shaped passages in the heat exchangers 6,8. The gaps 28 provide some thermal insulation between the fins 26 and the casing walls. Little heat is lost or picked up by the ends of the pipe 18 which project slightly into the ambient atmosphere from the casing 2 and the heat exchanger 8. Additional aluminum fins 32 project from the portions of the pipe 18 in the passages of the heat exchangers 6,8 into the water or other heating and cooling medium that may flow through the passages.

Depending on the specific application and the nature of the heating and cooling medium, other heat storing materials and other heat transfer fluids will redily be chosen for charging the casing 2 and the heat pipe 18. Parraffin waxes having 14 to 30 carbon atoms and mixtures of the same having melting points between about 6° and 66° C have latent heats of liquefaction of 55 – 60 Cal./kg and are eminently suitable in heat storing arrangements of this invention for domestic heating plants. Hydrated salts which may replace the paraffin wax specifically described above include $Na_2HPO_4.12$-

$H_2O$ and $LiNO_3 \cdot 3H_2O$, but others are known to have suitable heats of liquefaction and solidification and have been used for this reason in freezing mixtures. Various grades of polyethylene are useful at temperatures too high for the paraffin waxes, and metals such as gallium and potassium may be employed at even higher operating temperatures. Additional suitable materials will readily suggest themselves as other conditions may require, and materials of construction will be selected accordingly.

The afore-mentioned halogenated alkanes cover a wide range of boiling points at ambient pressure, and their boiling temperatures can be modified by maintaining suitable pressures within the pipe 18, but they may be replaced by other fluids which are partly liquid and partly gaseous at the discharge temperature of the heat storing material. Water, ammonia, acetone, and other low-boiling organic solvents are effective at or near ambient temperatures, but potassium or sodium may also be used for operation at temperatures as high as 1400° C for which apparatus analogous to that of FIG. 1 may be constructed.

Heat transfer along the pipe 18 is rapid. Liquid fluid evaporates in portions of the pipe from which heat is to be removed, and the vapor condenses in other, cooler pipe portions to transfer heat of liquefaction to the ambient heat storing material or to a heating and cooling medium. The fabric 24 enlarges the effective surface area of the liquid fluid portion and thereby enhances the rate of evaporation and condensation. The capillary passages also facilitate distribution of the liquid along the pipe 18 which is otherwise caused by gravity.

A typical application of the heat storage arrangement described above will be described hereinafter with reference to FIGS. 6 and 7.

For other applications, two heat exchangers 6,8 may not be necessary, and the modified apparatus illustrated in FIG. 2 differs from that described with reference to FIG. 1 mainly by having a single heat exchanger 6' not significantly different from the heat exchanger 6.

In the further modified thermal storage arrangement shown in FIG. 3, a single heat exchanger mainly consists of a coil 34 of copper tubing wound helically about the portion of the heat pipe 18 outside the container 2. A layer of polystyrene foam 36 covers the coil and associated portions of the heat pipe 10.

The storage arrangements shown in FIGS. 1 to 3 readily lend themselves to the construction of modular assemblies in which the individual units are stacked. Thus, a device of the type shown in FIG. 1 may be interposed between identical higher and lower units, the ports 12,16 of the intermediate unit being connected to the ports 10,14 of the higher unit, and the lower unit being connected to the intermediate unit in an analogous manner. Storage arrangements varying greatly in their capacity may be built from a single type of basic units.

Larger storage capacity may also be achieved in the manner shown in FIGS. 4a, 4b. Sixteen heat pipes 18', closely similar to the afore-described pipe 18, are arranged equidistant in four rows and four columns in a large, common casing 2' of square cross section and in a flangedly attached single heat exchanger 6' of identical cross section. The portions of the pipes 18' in the chamber of the casing 2' carry square fins 26', and the fins welded to each pipe 18' bound narrow gaps with the fins associated with adjacent pipes. The separate fins facilitate installation, but do not provide optimum heat transfer between the fluid in the several pipes 18' and the surrounding heat storing material 4. Fins are normally also provided on the several pipes 18' in the heat exchanger 6', but have been omitted from FIG. 4a for the sake of clearer pictorial representation.

The multiple pipe arrangement illustrated in FIGS. 5a, 5b has a casing 2" which is cylindrical and flanged to a correspondingly shaped heat exchanger 6". One heat pipe 18' passes coaxially through the casing 2" and the heat exchanger 6", and six additional pipes 18' are equi-angularly spaced about the coaxial pipe. Circular fins 26" are almost equal in diameter to the chamber in the casing 2" so as to leave only narrow gaps 28 between their outer circumferences and the inner cylindrical wall 30' of the casing 2". Each fin 26" is welded to each heat pipe 18' for good thermal contact.

Figure 7:
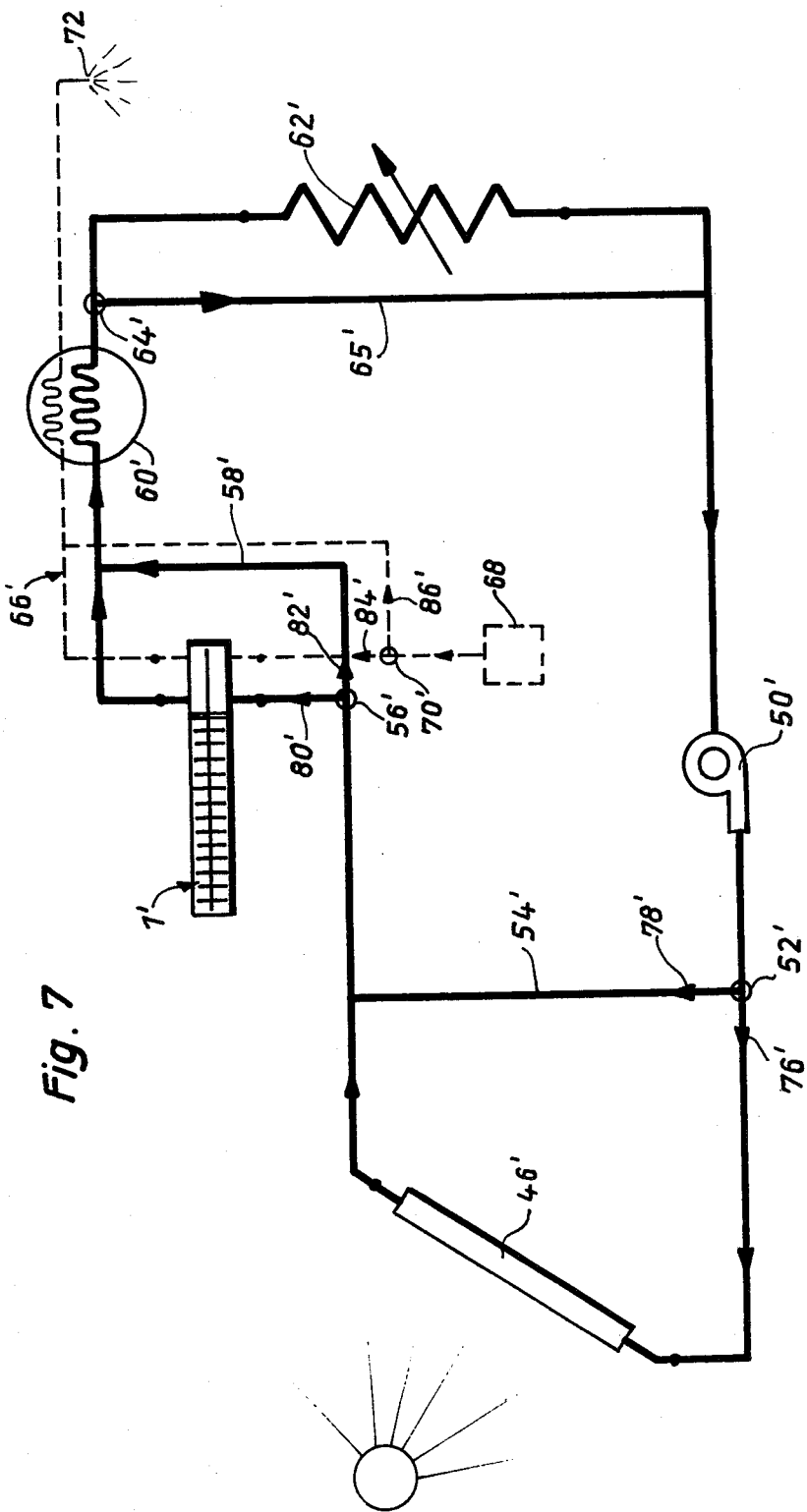

It will be appreciated that each of the storage arrangements shown in FIGS. 3, 4a, 5a may be equipped with a second heat exchanger for use in the domestic heating and hot water systems illustrated in FIGS. 6 and 7.

The system shown in FIG. 6 has a primary hydraulic circuit 40 and a secondary hydraulic circuit 42 in which water is circulated as a heating and cooling medium by pumps 44,50 respectively, and which are connected by a tube-and-shell heat exchanger 48. In addition to the shell of the exchanger 48 and the pump 44, the primary circuit 40 includes a solar heating panel 46 and a shut-off valve 74.

In the secondary hydraulic circuit 42, a two-way valve 52 having discharge ports 76,78 directs the output of the pump 50 either through the tubes of the heat exchanger 48 or through a by-pass 54 to another two-way valve 56 whose discharge port 80 is connected to the intake port 10 of the storage device 1 more fully shown in FIG. 1. The discharge port 12 of the latter and a by-pass connected to the other discharge port 82 of the valve 56 are connected to a coil in an auxiliary heater 60. The output of the heater is returned to the pump 50 through a further two-way valve 64 and either through a thermostatically controlled radiator 62 or a by-pass 65. The single illustrated radiator 62 represents the several radiators employed for heating a house.

The hot-water supply of the house, illustrated by a broken line 66, draws water from a well, a reservoir, or a public water system 68 under a pressure sufficient to drive the cold water through a two-way valve 70 to another coil in the auxiliary heater 60 either through a discharge port 84 of the valve 70 and the heat exchanger 8 in the storage device 1, or through a by-pass connected to the other discharge port 86 of the valve 70. From the auxiliary heater 60, hot water is supplied to the several faucets and other taps in the house, such as the illustrated shower 72.

The several valves are provided with temperature responsive actuators which are also linked to the energizing circuits of the pumps 44,50 so that the system illustrated in FIG. 6 operates in the following automatic manner.

When the sun supplies sufficient energy to the panel 46, the pumps 44,50 are energized, the valve 74 is opened, toward the ports 76,80,84. Solar heat is transferred to the heat storing material in the storage device 1 and supplied to the radiator 62 in circulating water. Depending on the thermostat setting for the radiator 62, the circulating water may be heated further by burning oil or gas in the auxiliary heater 60.

When the temperature in the primary circuit 40 drops below a set minimum, the valve 74 is closed, and the pump 44 is shut off. If freezing of the water in the circuit 40 is to be guarded against, the circuit may be provided with a non-illustrated valve and pump which drain the circuit 40 and fill it again with water as the temperature of the panel 46 rises and falls.

When the temperature in the heat exchanger 48 drops to a value lower than the temperature of the water discharged from the radiator 62, the valve 52 switches to the by-pass 54 to prevent heat loss toward the circuit 40. If the temperature of the water discharged from the storage device 1 drops below a set minimum, the valve 56 switches to the by-pass 58, and all heating energy thereafter is supplied by the auxiliary heater 60. The valve 70 in the hot-water system is operated in an analogous manner when the heat storage device 1 cannot maintain a desired water temperature at the discharge port of the heat exchanger 8.

An alternate heating system is shown in FIG. 7. It has a single heating circuit equipped, in series, with a centrifugal circulating pump 50', a solar panel 46' and a by-pass 54' arranged in parallel and alternatively supplied with heating medium by the discharg4e ports 76',78' of a valve 52', another valve 56' with discharge ports 80',82' leading through the heat exchanger 6 of the storage arrangement 1 or through a by-pass 58' to an auxiliary heater 60' and thence back to the pump 50' through a radiator 62' or a by-pass 65' depending on the setting of a valve 64'.

Hot water is furnished by a circuit 66' from a supply 68 to a shower 72 through a valve 70' having discharge ports 84',86' connected to the heat exchanger 8 and a by-pass respectively, and through the auxiliary heater 60'. The operation of the system illustrated in FIG. 7 is closely similar to that described with reference to FIG. 6, but the apparatus of FIG. 7 is designed for the use of a gaseous heat transfer medium, such as hot air, and it will be appreciated that the radiator 62' in this instance may be replaced by a system of registers conventional in itself.

During adequate sunshine, the valves 52',56',70' open their discharge ports 76',80',84', and the heated, gaseous medium yields some of its thermal energy to the storage device 1 and may be heated to a higher temperature by the heater 60'. When the gas leaving the collector panel 46' does not maintain a desired minimum temperature, the valve 52' is switched to the by-pass 54', and other valves operate in a manner obvious from the aforedescribed mode of operation of the system shown in FIG. 6.

The devices for storing thermal energy illustrated in FIGS. 2 to 5b may be substituted in an obvious manner in the systems of FIGS. 6 and 7 if an independent hot-water supply is furnished, and other variations of these solar heating systems will readily suggest themselves to those skilled in the art.

It should be understood, therefore, that the foregoing disclosure relates only to preferred embodiments of the invention, and that it is intended to cover all changes and modifications in the examples of the invention chosen for the purpose of the disclosure which do not constitute departures from the spirit and scope of the invention set forth in the appended claims.

What is claimed is:
1. A thermal storage arrangement comprising:
    (a) a container bounding a chamber therein;
    (b) a material in said chamber undergoing a phase transition between the liquid state and the solid state when at a predetermined temperature;
    (c) a first heat exchanger and a second heat exchanger, each heat exchanger being formed with an intake port and a discharge port and defining a through passage connecting said ports for flow of a heating and cooling medium between said ports;
    (d) an elongated, sealed tube having a first longitudinal portion in said chamber, and second and third longitudinal portions outside said chamber and in thermal contact with a medium flowing through the passages of said first and second heat exchangers respectively;
    (e) a plurality of fins of thermally conductive material transversely projecting from said first portion into direct contact with said material; and
    (f) a fluid in said tube, said fluid being partly liquid and partly gaseous at said predetermined temperature.

2. An arrangement as set forth in claim 1, wherein a wall is common to said container and said first heat exchanger, respective faces of said wall bounding said chamber and said passage of the first heat exchanger.

3. An arrangement as set forth in claim 2, further comprising a plurality of fins of thermally conductive material transversely projecting from said second portion in said passage.

4. An arrangement as set forth in claim 1, wherein said first portion has a length at least approximately equal to the dimension of said chamber in the direction of elongation of said tube.

5. An arrangement as set forth in claim 4, wherein said container has a wall extending in the direction of elongation of said tube, said wall and each of said fins defining therebetween a gap narrower than the spacing of said gap from said tube.

6. An arrangement as set forth in claim 1, wherein said material is selected from the group consisting of waxes, hydrated salts, and metals, and said fluid is a member of the group consisting of water, chloro-fluoroalkanes, ammonia, acetone, potassium, and sodium, said fluid being different from said material.

7. An arrangement as set forth in claim 1, wherein said second and third portions are received in the passages of said first and second heat exchanger respectively.

* * * * *